Figure 1:
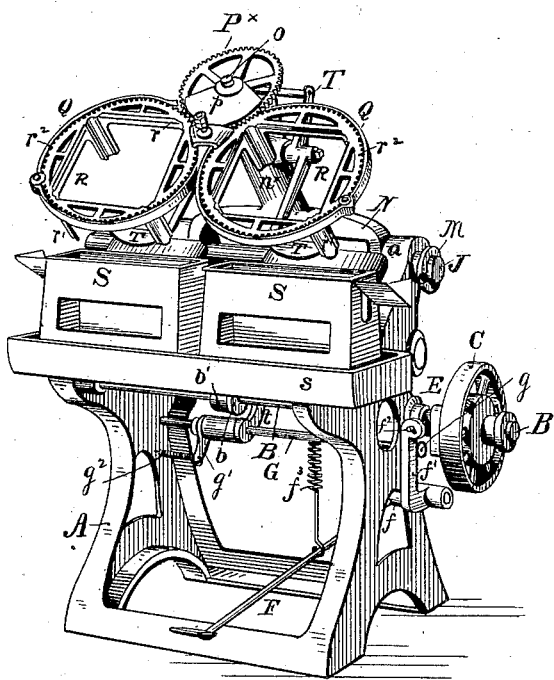

(No Model.) 7 Sheets—Sheet 1.
G. H. PERKINS & O. SMITH.
APPARATUS FOR AUTOMATICALLY SOLDERING THE SEAMS OF
SHEET METAL CANS.

No. 314,468. Patented Mar. 24, 1885.

WITNESSES:

George H. Perkins
Oberlin Smith
INVENTORS
By their Attorneys (No Model.) 7 Sheets—Sheet 2.
G. H. PERKINS & O. SMITH.
APPARATUS FOR AUTOMATICALLY SOLDERING THE SEAMS OF
SHEET METAL CANS.
No. 314,468. Patented Mar. 24, 1885.
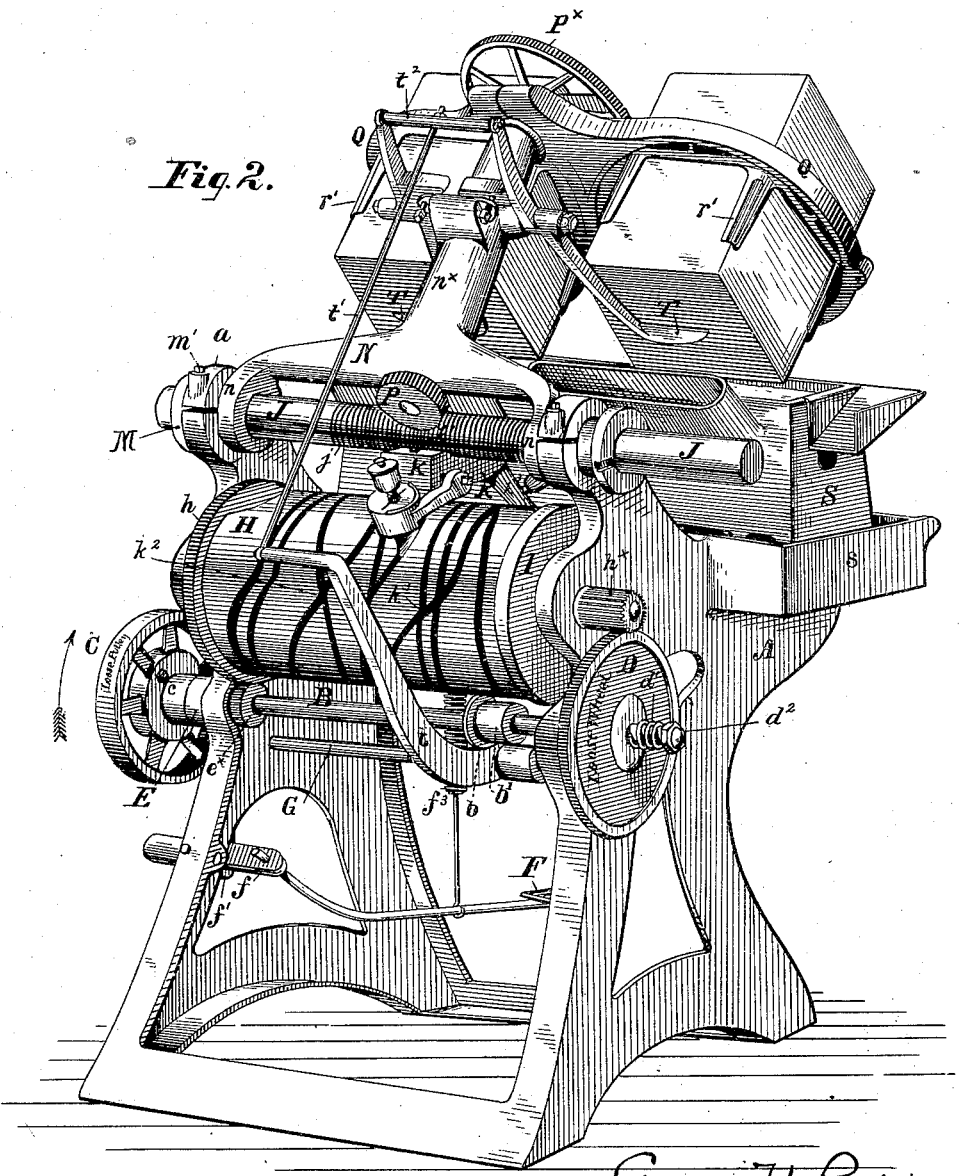

(No Model.)     7 Sheets—Sheet 3.
G. H. PERKINS & O. SMITH.
APPARATUS FOR AUTOMATICALLY SOLDERING THE SEAMS OF
SHEET METAL CANS.
No. 314,468.     Patented Mar. 24, 1885.
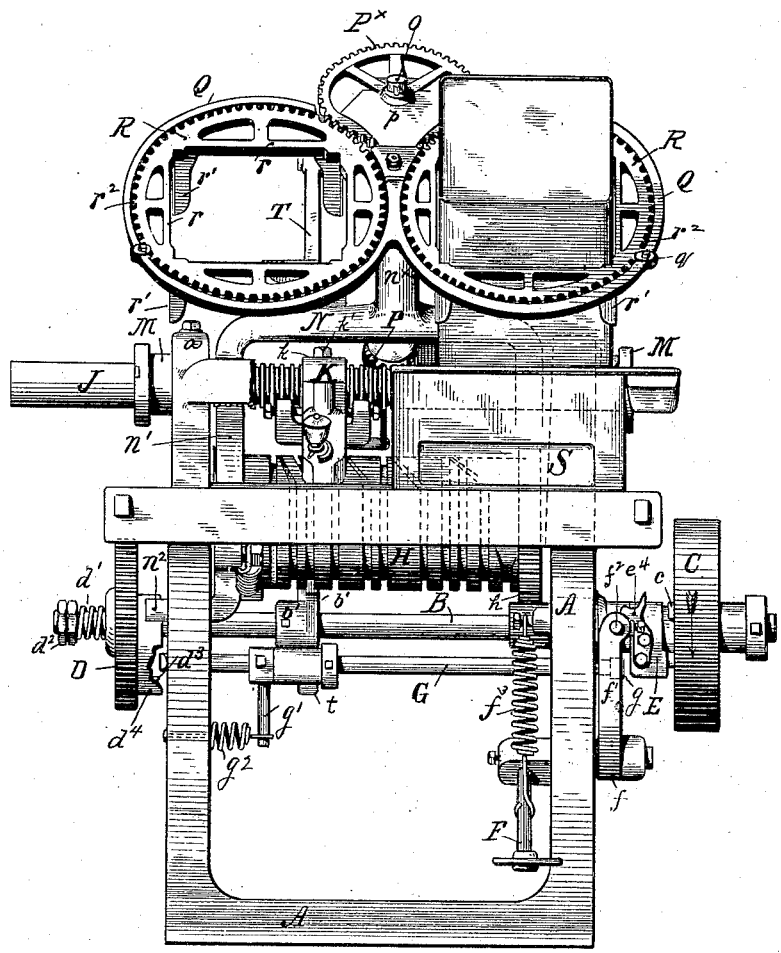
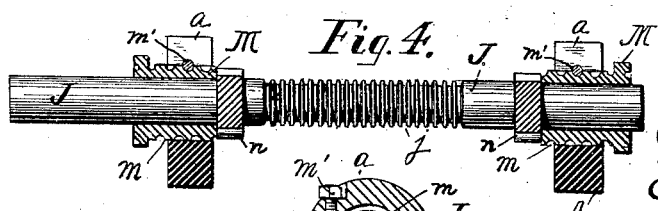
WITNESSES:     INVENTORS (No Model.) 7 Sheets—Sheet 4.

G. H. PERKINS & O. SMITH.
APPARATUS FOR AUTOMATICALLY SOLDERING THE SEAMS OF SHEET METAL CANS.

No. 314,468. Patented Mar. 24, 1885.

WITNESSES:

INVENTORS
George H. Perkins
Oberlin Smith
By their Attorney (No Model.) 7 Sheets—Sheet 5.

G. H. PERKINS & O. SMITH.
APPARATUS FOR AUTOMATICALLY SOLDERING THE SEAMS OF SHEET METAL CANS.

No. 314,468. Patented Mar. 24, 1885.

(No Model.) 7 Sheets—Sheet 6.
G. H. PERKINS & O. SMITH.
APPARATUS FOR AUTOMATICALLY SOLDERING THE SEAMS OF SHEET METAL CANS.
No. 314,468. Patented Mar. 24, 1885.
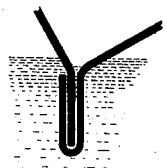
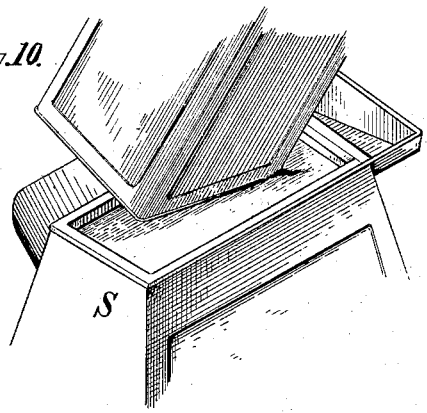
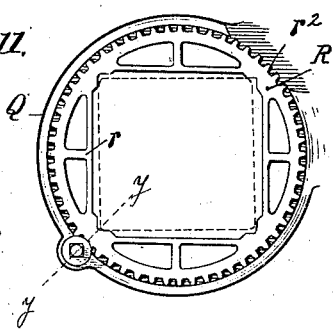
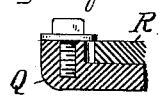
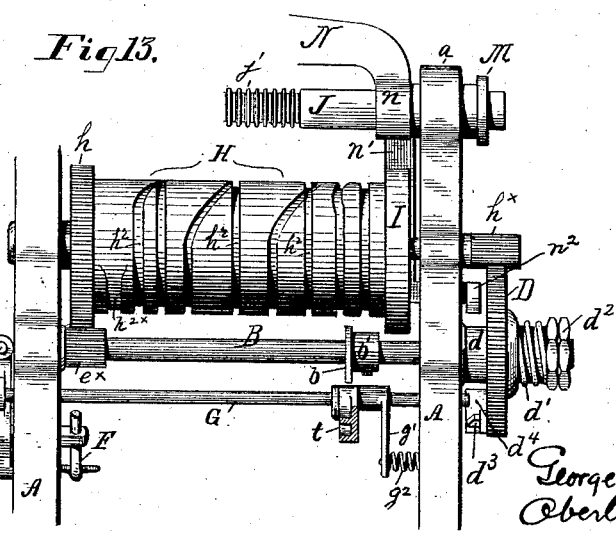
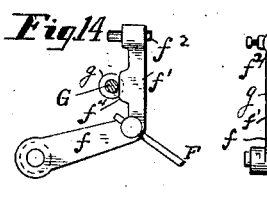
WITNESSES:
INVENTORS (No Model.) 7 Sheets—Sheet 7.
G. H. PERKINS & O. SMITH.
APPARATUS FOR AUTOMATICALLY SOLDERING THE SEAMS OF SHEET METAL CANS.
No. 314,468. Patented Mar. 24, 1885.
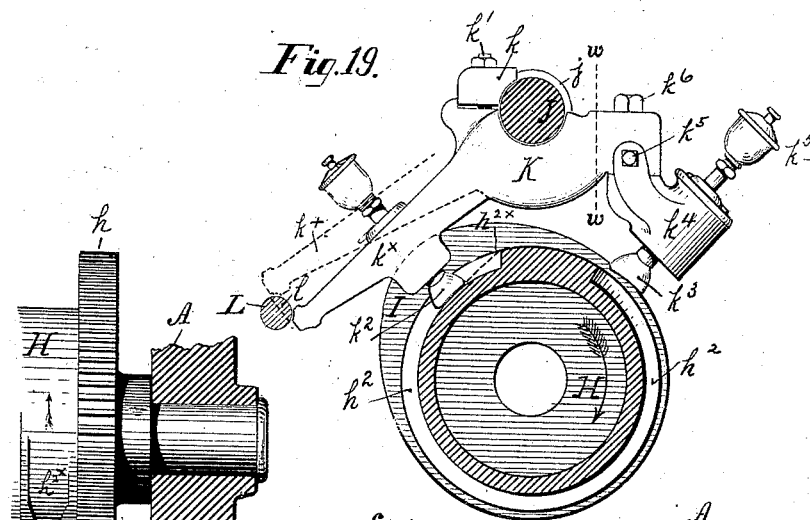
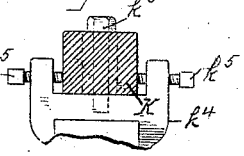
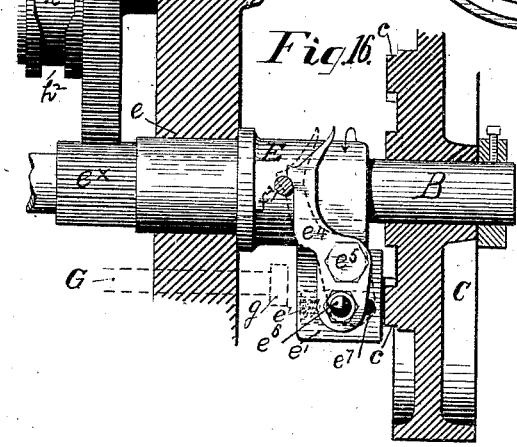
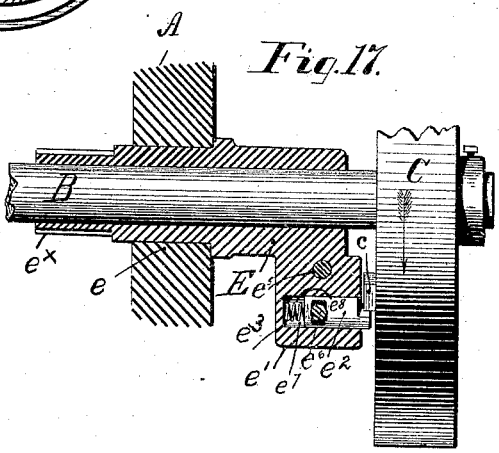
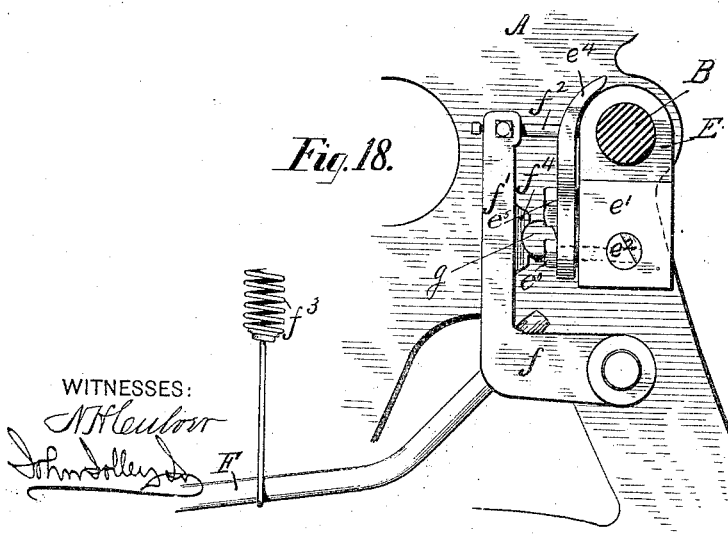
WITNESSES:
George H. Perkins
Oberlin Smith
INVENTORS

UNITED STATES PATENT OFFICE.

GEORGE H. PERKINS, OF PHILADELPHIA, PA., AND OBERLIN SMITH, OF BRIDGETON, N. J.; SAID SMITH ASSIGNOR TO SAID PERKINS.

APPARATUS FOR AUTOMATICALLY SOLDERING THE SEAMS OF SHEET-METAL CANS.

SPECIFICATION forming part of Letters Patent No. 314,468, dated March 24, 1885.

Application filed July 22, 1884. (No model.)

*To all whom it may concern:*

Be it known that we, GEORGE H. PERKINS, of the city and county of Philadelphia, and State of Pennsylvania, and a citizen of the United States, and OBERLIN SMITH, of Bridgeton, in the county of Cumberland and State of New Jersey, and likewise a citizen of the United States, have invented certain improvements in apparatus for automatically soldering the seams which unite the heads or tops and bottoms to the bodies of quadrangular, square, hexagonal, and other shaped sheet-metal cans having angular or approximately angular corners, of which the following is a specification.

After the seams—that is, the series of sides which compose them—which are the means of uniting the heads to the bodies of cans of the above description, have been tightly closed by such instrumentalities as may be preferred and flux has been applied to said seams, the next and last step essential to the completion of the closing and hermetical sealing of the can is the soldering of said seams.

The present invention embraces an apparatus for carrying out upon a somewhat extensive scale a method of soldering the seams of cans invented by the above-named GEORGE H. PERKINS, and constituting the subject-matter of United States Letters Patent No. 288,363, granted to the said Perkins November 13, 1883, upon an application executed January 20, 1883, and filed February 1, 1883.

The object of the above-mentioned invention, as well as that of the present invention, is to insure complete hermetical sealing with the minimum of solder by the utilization of the principle of immediate drainage of each side of the seam after the removal of such side from the solder bath.

Reference to the foregoing Letters Patent will render more easy a comprehension of the present improvements.

It is proper here to remark that in soldering two objects are to be had in view—first, saving of time; and, second, saving of solder; and, further, that many methods involving the use of various devices have been with more or less economy adopted for the purpose, mention of which will be found in the preamble of the above-named Letters Patent No. 288,363.

In order to an accurate comprehension of our present improvements, we regard it as necessary to recite that the invention of the said Perkins, in methods of soldering referred to, makes use of a machine in which a suitable frame-work contains all the operative parts and supports both a solder pot or bath and a furnace for retaining in a molten condition the solder in the pot, and that the operative parts, or those which effect the manipulation of the can and the immersion of its head-seams after its introduction into the holder of the machine, and which in the present invention are partly modified and partly dispensed with, are, first, a revoluble can-holder larger than the can and conformed to the horizontal sectional outline of the can, into which the can is loosely inserted or dropped; second, a vertically reciprocating or sliding head, to which the revoluble can-holder is connected, and by which it is lifted and dropped, so as to lift the seam of the can from out of and submerge it in the bath; third, a disk-cam, the periphery of which is suitably conformed to lift and drop the sliding head at the proper times after the proper intervals, and to the required extent; fourth, devices connected with the disk-cam, which at predetermined intervals occasion predetermined rotations of the can-holder during periods when it is elevated by the lift of its sliding head; fifth, means for locking or tightly holding the can-holder in the various positions of rotation which it is caused to assume; and, sixth, mechanism for occasioning predetermined movements in the disk-cam.

We also regard it as necessary here to recite that the essential characteristics of the machine above outlined (the same being also characteristics of this improvement) are that it enables the dipping of the several sides of the head-seams of an angular can in rapid successive order; that it further enables the withdrawal of each side of the seam in turn (after being dipped) from out the solder bath at an angle with respect to the plane of the surface of said bath, so that one end or corner bounding said side of the seam so dipped is lifted from the solder before the other corner of said side, and the side itself of the seam so dipped, considered as an entirety, is, as stated, taken out from the bath in an angular position, and in such a position that said seam is permitted to drain from the corner first toward the corner last taken out; that it enables, moreover, the continuous drainage of the side of the seam last dipped, on which the solder is still hot and in consistency to drain during the time when the side of the seam next in order is being dipped, by placing the seam last dipped in an approximately-vertical plane; that it enables, again, the lifting of that side of the head-seam which is dipped last from out the solder bath in an angularly-opposite position from that in which the side of said seam immediately preceding it stood when said side was lifted, in order that the last side of the seam may drain in an opposite direction from that in which the side immediately preceding it drained, or toward that corner of the head-seam of the can which is intermediate between the last and the next to the last side of said seam dipped; that it enables the subsequent dipping of said intermediate corner, so as to insure the drainage of even the last drop from off said corner and seam; and that it enables, finally, the ready insertion and removal of the can by reason of the holders being made larger than the can.

All of the above operations in the above-recited form of apparatus, as well as in the present improved form, are in a measure due to the fact that the can-holder, although of the same outline, is somewhat larger than the exterior of the can.

Our present invention is also an improvement upon a certain soldering-machine invented by the above-named George H. Perkins and constituting the subject-matter of United States Letters Patent No. 297,629, granted to the said Perkins, April 29, 1884, upon an application executed January 25, 1883, and filed in the United States Patent Office March 23, 1883.

The aforesaid improved machine, which constitutes the subject-matter of the foregoing Patent No. 297,629, is operative to the practicing of precisely the method of the successive dipping of the sides of the head-seams and their successive withdrawal from the solder bath in an angular position, and the subsequent dipping of a corner, which the first-named invention of the said Perkins enables, operates to effect, and with all the incidental advantages due to such operation; and it embodies and makes use of the same can-holder made slightly larger than the can, and the same or any equivalent pattern of solder bath and furnace, differing from the said first-mentioned machine in the instrumentalities employed to occasion the rise and fall of the can-holders, the quarter-rotations of the can-holder necessary to present the successive sides of the seams, and the eighth-rotation necessary to enable the dipping of a corner, and differing, further, in the supporting of the can-holders and holder-supports upon rock-shaft arms suitably actuated to rise and fall, not in a perpendicular direction, but in a slight arc.

For a further description of the last-mentioned invention reference is to be made to Letters Patent No. 297,629.

The apparatus which constitutes the subject-matter of this invention effectuates, as stated, precisely the process carried out by the apparatus of Letters Patent No. 288,363, and differs from said apparatus, as well as from the apparatus of Letters Patent No. 297,629, in the mechanical organization of its parts, approximating more nearly in its said organization to that of the apparatus of Letters Patent No. 297,629, as will be obvious when the present invention is understood.

The present apparatus is to be contradistinguished, equally with the inventions of the said Perkins recited, from all former apparatus. Its objects in economizing solder and labor are precisely the same as those of the said inventions, and its merits, as compared with the said inventions, lie in the simplicity and cheapness of its mechanical organization and the rapidity and thoroughness with which it performs its work.

The foregoing objects are secured and results attained by mechanism, a preferred form of a convenient embodiment of which is described in the following specification and illustrated in the accompanying drawings, the particular subject-matter claimed as new being hereinafter definitely specified.

Figure 6:
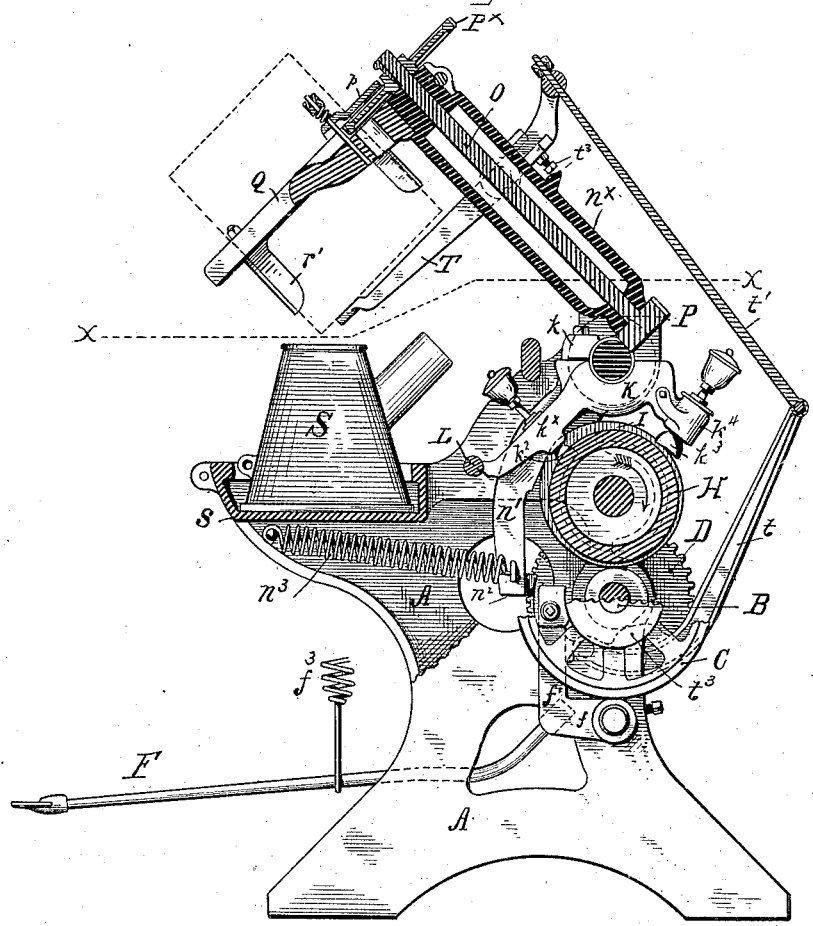
Figure 15:
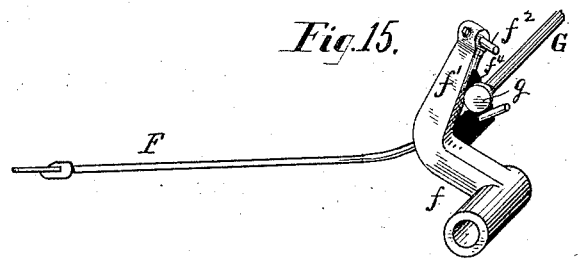
Figure 7:
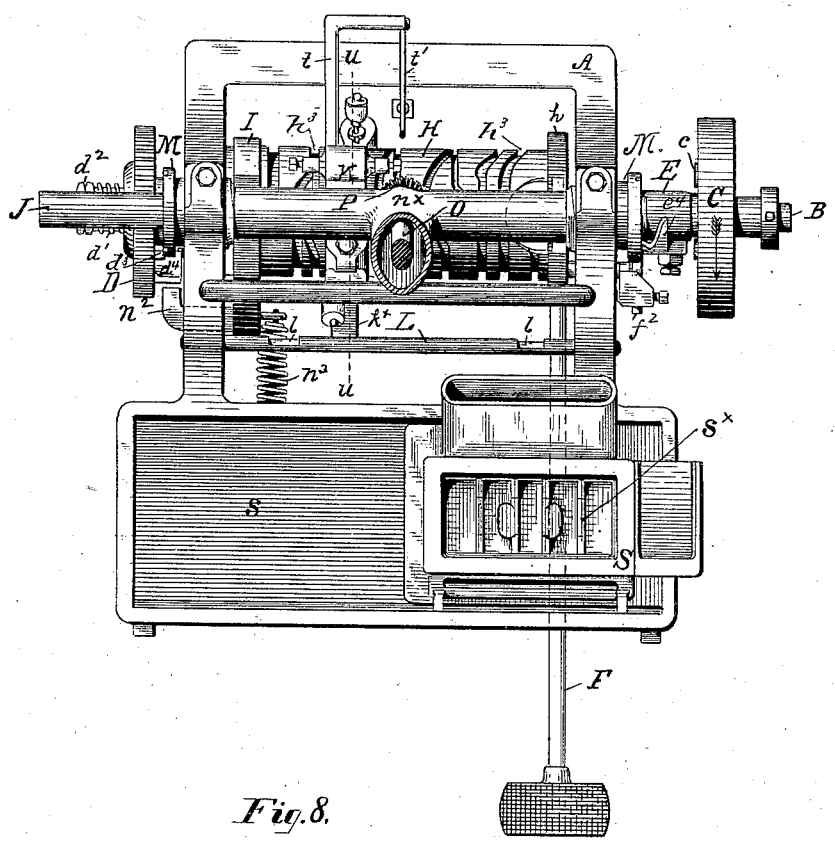
Figure 8:
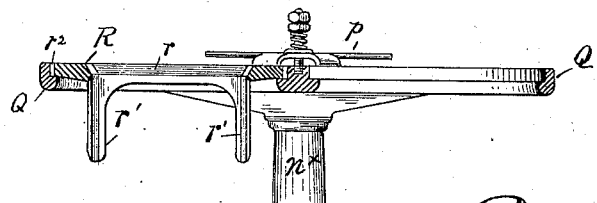
Figure 21:
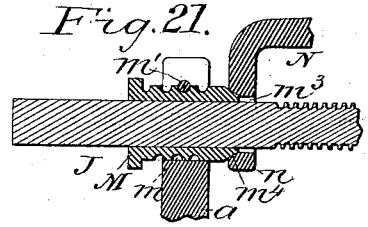

In the accompanying drawings, Figure 1 represents in perspective a front view of a completed apparatus embodying our invention, the can-holders being represented as empty and the apparatus standing in a position of rest. Fig. 2 represents in perspective a rear view of the said machine, two cans being shown inserted in the holders and the parts being in the position which they occupy at the moment when the rocking head has risen from the soldering-pans, and just prior to the descent of the holders. Fig. 3 is a front elevational view of the said machine, the parts being shown in the positions which they occupy after the descent of the rocking head and when the seams are immersed, one of the soldering-pans being, for clearness, shown removed. In this view the can-holders are supposed to be slightly oblique with the surface of the solder-pan. Fig. 4 is a top plan view of the rack-shaft, the screw-sleeves which permit of the lateral adjustment of the rocking head being represented in section, and the bearings of the rocking head being also represented in section. Fig. 5 is a side vertical sectional detail through one of the screw-sleeve bearings in the housing, representing one of the screw-sleeves and its key-bolt. Fig. 6 is a partially elevational and partially sectional side view of the apparatus of Fig. 1, sight being taken from the right-hand side of said Fig. 1, and so much of the apparatus as is represented in section being taken in a vertical plane bisecting the tubular arm of the rocking head, the view being especially adapted to represent the leg of the rocking head, the shuttle-carrier, and shuttle-drum, the can-holders being raised. Fig. 7 is a top plan view of the apparatus as shown in Fig. 3, section being supposed in a plane of the dotted line x x of Fig. 6, and one of the soldering-pans being shown removed from the tray. Fig. 8 is a front sectional elevational detail through the can-holder supports, showing one of the can-holders in place, and representing also the upper extremity of the tubular arm of the rocking head. Fig. 9 is a sectional diagram representative of the position of the seam of the can when immersed in the molten solder, the seam being shown as occupying a position at right angles to the plane of the surface of said solder. Fig. 10 is a view in perspective of one of the cans and one of the solder-pans, representing the angle at which said can is lifted by its can-holders from out the solder bath. Fig. 11 is a top plan view of one of the can-holder supports and its can-holder. Fig. 12 is a transverse sectional elevational detail through a can-holder support and can-holder, and through the bolt and washer which retain said can-holder in position in the support, section being supposed in a plane projected on the dotted line y y of Fig. 11. Fig. 13 is a rear elevational view of a portion of the housing and rack-shaft, of the shuttle-drum, driving-shaft, shifter-rod, treadle-head, and connected appliances, the knockout-lever being shown in section, and the driving-pulley and clutch-carrier being, for clearer illustration, omitted. Fig. 14 is a view of the treadle-head, arm, and stop-pin, looking upon the said parts as they are shown in Fig. 13, from the right-hand side of the said figure, the view also showing the head of the shifter-rod as out of engagement with the flange on the treadle-head. Fig. 15 is a view in perspective of the parts represented in Fig. 14, the view, however, being taken from the outside or left-hand side of the said parts as they are represented in Fig. 13. Fig. 16 is a longitudinal vertical partially elevational and partially sectional front view of one of the side frames of the housing, the driving-shaft, driving-pulley, clutch-carrier, and its connected appliances, shuttle-drum, and drum spur-wheel, the trigger of the clutch being represented in full lines in the position which it occupies when the stop-pin of the treadle is engaged against it to retain the plunger within its socket, in this latter regard the parts being in the same position which they are represented as occupying in Fig. 18. Fig. 17 is a longitudinal vertical sectional front elevation through the clutch-carrier and its plunger socket-piece, representing the socket of the plunger and the spring contained in said socket, the device being supplementary to that of Fig. 16. Fig. 18 is a side elevational view of certain of the parts represented in Fig. 16, section being supposed in a vertical plane projected on the line z z of said Fig. 16, and sight being taken from the right hand of said figure, the treadle, treadle-head, and arm being also shown in the position which they occupy when the stop-pin of said treadle is in the position which it is represented as occupying in said Fig. 16. Fig. 19 is a transverse sectional view of the shuttle-carrier and through the shuttle-drum, taken, for instance, on the line u u of Fig. 7, and viewed from the right-hand side of said figure, the view being especially illustrative of the shuttle-carrier and shuttles, the shuttle guide-bar, the shuttle-ways of the drum, and the head-cam on said drum. Fig. 20 is a transverse sectional elevational detail through the shuttle-carrier in the plane of the line w w of Fig. 19, and viewed from the left-hand side of said figure, it being designed to represent the adjustable connection of the shuttle-casting with the shuttle-carrier. Fig. 21 is a fragmentary sectional detail representing one end of the rack-shaft and one of the screw-sleeves, the office of which is not only to journal but to permit of the lateral adjustment of the rocking head, the view being especially designed to illustrate the application of the rocking head upon a conical or taper-ended screw-sleeve.

Similar letters of reference indicate corresponding parts.

In the drawings, A is a frame-work, stand, or housing of any preferred construction, configuration, and material, but conveniently of the construction represented in the drawings, and especially illustrated in Figs. 1, 2, 3, and 6. This housing affords points of bearing or support for the various movable parts of the apparatus.

B, Figs. 2, 3, 6, 13, 16, 17, and 18, is the driving-shaft, being that shaft from which, when in rotation, motion is primarily transmitted to all of the moving parts, and which is suitably journaled longitudinally in the rear of the housing. This shaft is exterior to one of the side frames of the housing equipped with a "loose" driving-pulley, C, and rotates intermittently under the actuation of said pulley, its rotation taking place when the clutch makes the pulley fast upon it, and ceasing when the clutch makes the pulley loose. The pulley is driven by a power-belt, or in any usual manner. Between the side frames of the housing this shaft is rigidly equipped with what we term the "knockout-cam" b, Figs. 2, 3, and 13, which is an irregular eccentric mounted upon a tubular hub, b', which extends laterally with respect thereto. This knockout-cam rotates when the driving-shaft rotates. The driving-shaft also carries, conveniently upon its extremity opposite to that to which the pulley is secured, a loosely-revoluble toothed spur-wheel, which we term the "trip spur-wheel" D, Figs. 2, 3, and 13, which is adjustable with respect to its longitudinal position or set on the driving-shaft between a collar, d, and a tension-spring, d', controlled by jam-nuts $d^2$, as will be understood by reference to Fig. 13 of the drawings. The inner face of this trip spur-wheel, or that facing the housing, is provided with an inclined surface or trip, $d^3$, Figs. 3 and 13, designed to occasion the predetermined endwise movement of the shifter-rod, as hereinafter explained. The trip spur-wheel is also provided with what we term a "head-stop," $d^4$, Figs. 3, 7, and 13, the same being an arc-shaped flange formed upon the inner face of said spur-wheel, near its periphery, and serving to limit the downward movement of or retain the rocking head in its position of greatest elevation when the machine is dipping the corners of the cans, as hereinafter explained.

The right-hand end portion of the driving-shaft, or that portion the extremity of which is provided with a driving-pulley, has fixed upon it what we term a "clutch-carrier," E, the same being a tubular sleeve, itself having a bearing, $e$, in the right-hand side frame of the housing.

$e^x$, Figs. 13, 16, and 17, is what we term the "drum-pinion," it being a part of the clutch-carrier on the inside of the housing.

$e'$ is a plunger-socket piece, being a radially-extending casting formed as a part of the clutch-carrier outside of the housing, which is provided with a socket, $e^8$, to contain a plunger, $e^2$, and plunger-spring $e^3$, as shown in Fig. 17. To the exterior side face of the plunger-socket piece is pivoted, by means of the pivot-pin $e^5$, a clutch-trigger, $e^4$, Figs. 3, 7, and 16, which, by means of a plunger-pin, $e^6$, passing through a slot, $e^7$, in the plunger-socket piece $e'$, is in engagement with the plunger-socket piece $e^2$. It is obvious that a movement of the clutch-trigger about its pivot will occasion either the projection or retraction of the plunger with respect to its socket $e^8$ in the plunger-socket piece $e'$. A lug, $c$, formed on the inner face of the driving-pulley, is adapted to be encountered by the plunger $e^2$ when projected from its socket, and so to occasion the revolution with the shaft of the clutch-carrier E and drum-pinion $e^x$, which is a part of said carrier. When the clutch-carrier is at rest, the machine is at rest.

The operation of the clutch-trigger, and consequently of the clutch devices proper, is under the control of a foot-treadle, $f$, Figs. 1, 2, 3, 6, 7, 13, 14, 15, 16, and 18. This treadle is pivoted to the housing below the clutch devices by means of a treadle-head, $f$, provided with an upwardly-extending treadle-arm, $f'$, Figs. 14, 15, and 18, the upper extremity of which treadle-arm is provided with a stop-pin, $f^2$, which faces to the rear and is in range when the treadle is at rest, or in its upper position under the influence of the treadle-spring $f^3$, to first deflect and then engage against the upper arm of the clutch-trigger $e^4$, and to retain said trigger in such deflected position, as shown in Fig. 16, as to retain the plunger within its socket, and permit of the free revolution of the driving-pulley without occasioning the revolution, in conjunction therewith, of the clutch-carrier, which takes place as soon as the treadle is depressed and the treadle-stop thereby withdrawn from engagement with the trigger. The arm $f'$ of the treadle is provided with a flange, $f^4$, Figs. 13, 14, 15, and 18, which, when the treadle is depressed so as to retract its stop-pin from range of engagement with the clutch-trigger, is itself adapted to be engaged against a disk-shaped head, $g$, upon the right-hand extremity of a shifter-rod, G, Figs. 1, 2, 3, 13, 14, 15, and 18, journaled in slide-bearings in the housing below the driving-shaft, when said head $g$ is caused, by a movement of the shifter-rod brought about by a finger, $g'$, controlled by a finger-spring, $g^2$, Figs. 1, 3, and 13, to stand in the path of said flange. The return movement of the shifter-rod, or that which causes the placing of its head $g$ out of the path of the flange on the treadle and permits the latter to assume its position of normal rest, and so bring about the stoppage of the machine, is occasioned by the trip $d^3$ on the trip spur-wheel D, hereinbefore described, the path and time of movement of which trip are such as to cause it to encounter the extremity of the shifter-rod at the moment when it is desired to force its head beyond the flange on the treadle-arm, or into the position represented in Figs. 13, 14, 15, and 18. It is obvious that when the trip $d^3$ has, in the action of the trip spur-wheel, hereinafter described, rotated beyond the extremity of the shifter-rod, if the treadle be then depressed, the operation of the finger-spring $g^2$ will be to draw the finger $g'$ and shifter-rod instantly to the right hand of the position which they are represented as occupying in Figs. 13 and 15, or into a position which, upon the release of the treadle by the foot, will occasion the treadle-flange $f^4$ to encounter the head $g$, and so cause the treadle-arm to be retained in such position that its stop-pin is not in the path of the trigger of the clutch. In this latter position the plunger-spring $e^3$ will operate to force the plunger $e^2$ out, so as to be engaged by the lug on the driving-pulley, whereupon the clutch-carrier will be in rotation with the driving-pulley and the machine in operation. The moment, however, that the trip $d^3$, in the further progressive rotation of the trip spur-wheel, occasioned as hereinafter explained, encounters the extremity of the shifter-rod, it will slide the latter to the left hand, or into the position shown in Fig. 13, and so shift the head $g$ from off the flange $f^4$ of the treadle, and permit the treadle-arm, under the influence of the treadle-spring $f^3$, to move upward and backward in such manner as to interpose its stop-pin $f^2$ in the path of the trigger, (which latter, when the plunger is out of its socket, stands in the position indicated in dotted lines in Fig. 16, and the upper portion or arm of which consequently presents an inclined surface to said stop-pin, which surface the latter, in the revolution of the trigger, utilizes for the deflection of said trigger in such manner as to occasion the retraction of the plunger into its socket,) and so to cause the further revolution of the driving-pulley to be without influence upon the clutch devices of the machine, which thereupon comes to a rest.

It now being understood in what manner the machine is stopped and started, and that the depression of the treadle is a prerequisite to the starting of the machine, it is proper to state that the clutch devices *per se* are not at the present time novel, and that they do not, except in connection with other members of the machine, form any part of this invention. It is also proper to state that the proportions and timing of the movement of the trip spur-wheel are in the mounting of the machine intentionally such as to occasion the passage of its trip out of range of engagement with the shifter-rod instantly after the machine has been started by the depression of the treadle, and so as to permit the shifter-rod to move to the right and cause its head $g$ instantly, upon relief of pressure on the treadle, to retain the treadle-stop out of range of engagement with the trigger, and such, moreover, as to cause the said trip to encounter the shifter-rod immediately after the can-holders have completed their last turn, so as to shift the said rod and permit the treadle-arm, under the influence of the treadle spring, to move in and place the treadle stop-pin in the path of the trigger, and so occasion the retraction of the plunger and the stoppage of the machine. It may be stated, also, that this method of locking a clutch arrangement into and out of action by a trip-rod during a given number of revolutions of a clutch-shaft (said number being determined by the ratio of the wheel D and pinion $h^\times$) is not in itself novel. It is, on the contrary, together with the clutch mechanism described above, a device previously invented by the said Oberlin Smith for controlling the movements of power-presses and other machines.

Having now explained the operation of the the driving-shaft, and in connection therewith of the shifter rod in its function of controlling the position of the treadle, and through the instrumentality of the treadle the operation of the clutch between the driving-pulley and driving-shaft, we pass to the consideration of the various devices which occasion the rise and fall of the rocking head which carries the can-holders, and the rotation of the can-holders themselves.

H, Figs. 2, 3, 6, 7, 13, 16, and 19, is the shuttle-drum, which is a cylinder of suitable diameter, conveniently mounted in suitable bearings in the housing, in vertical alignment above the driving-shaft, and which at one extremity is equipped with a drum spur-wheel, $h$, which engages with the drum-pinion $e^\times$ of the clutch-carrier, as shown in Figs. 2, 3, and 13. One extremity of the drum's shaft is prolonged beyond the housing, and equipped with a drum-pinion, $h^\times$, which engages with the trip spur-wheel D, and occasions the free revolution of the latter when the shuttle-drum revolves. The proportions of the drum-pinion and trip spur-wheel are such that the trip spur-wheel makes one revolution in every five of the shuttle-drum. The shuttle-drum or its shaft is also provided with a head-cam, I, Figs. 2, 6, 7, 13, and 19, the office of which in the revolution of the drum is to encounter a leg of the rocking head, and occasion the rocking of the latter, as hereinafter explained.

The shuttle-drum is provided with two series of sunken channels or camways, which we term "shuttle-ways," which are respectively designated $h^2$ $h^3$, and which in opposite directions and in continuous and approximately helical courses circumscribe the drum. The path of each of these shuttle-ways is composed of courses, in part right angular and in part diagonal to the axis of the drum, and at each of their extremities the respective shuttle-ways terminate in what we term "lifting-inclines" $h^{2\times}$ and $h^{3\times}$, which can best be observed in Figs. 3, 13, 16, and 19.

It is to be understood that each of the shuttle-ways, although irregular and sinuous in course, as explained, is continuous from end to end of the drum, and that the two ways intersect or cross each other.

The office of the shuttle-ways is, primarily, to occasion the longitudinal travel of the shuttles, as hereinafter explained. It will now be obvious that when the clutch-carrier is set in action, so as to revolve with the driving-shaft, the drum-pinion $e^\times$ on said driving-shaft will occasion the revolution of the shuttle-drum, and with it of the head cam and the drum-pinion $h^\times$, and consequently of the trip spur-wheel D.

J, Figs. 1, 2, 3, 4, 5, 6, 7, 13, and 19, is the sliding rack-shaft, the same being a cylindric shaft considerably longer than the breadth of the housing, and provided as to its central portion with a cylindrical rack, $j$. This shaft is capable not only of longitudinal travel in either direction in the screw-sleeves, which form its bearing, and with respect to the housing, but of oscillation with the shuttle-carrier.

Mounted upon the rack-shaft is the shuttle-carrier K, (best seen in Figs. 6 and 19,) the same being a two-armed casting, so to speak, whose shape is best described as that represented in the drawings, and which is fixedly mounted upon the rack-shaft by means of a segmental head, $k$, secured by a bolt, $k'$, the connection being such that any motion imparted to the said shuttle-carrier is transmitted to the rack-shaft.

The long arm $k^\times$, hereinafter termed simply the "arm" which is to the front of the carrier, is provided with what we term a "shuttle," $k^2$, which is a swiveled lug adapted, when deflected, to travel in the shuttle-way $h^2$ of the drum. A second or rear shuttle, $k^3$, of similar construction to the front shuttle, $k^2$, is connected with the shuttle-carrier by an adjustable shuttle-casting, $k^4$, a convenient construction of which is represented in Figs. 6, 19, and 20. The shuttle-casting $k^4$ is by means of the lateral bolts $k^5$ and the vertical bolt $k^6$ laterally adjustable with respect to the shuttle-carrier, and this for the purpose of permitting of a slight longitudinal adjustment of the rack-shaft, and, consequently, through the pinion-shaft, of a slight rotative adjustment of the can-holders, as any mechanic will understand when the operation of the can-holders, hereinafter described, is understood.

A reference to Figs. 6 and 19 will show that the two shuttles respectively bridge a segment of the circumference of the shuttle-drum, and that they are so mounted with respect to their carrier that but one shuttle at a time can be engaged in a shuttle-way of said drum.

Directing our description now to but one of the shuttles, but remembering that the action of one is in a reverse direction repeated by the other, the following is a description of the operation of the shuttles with respect to the shuttle-drum: Assume that the shuttle $k^2$, as in Fig. 19, is controlled to engage within the shuttle-way $h^2$ at one extremity thereof, it is obvious that a rotation of the drum in the direction of the arrow in said figure will occasion the travel of said shuttle throughout the length of said shuttle-way $h^2$, and with an intermittent movement correspondent to its path, and that this movement of the said shuttle will be transmitted to the shuttle-carrier, and consequently to the rack-shaft, so as to occasion the longitudinal intermittent travel of said carrier and said rack-shaft from one side of the machine to the other. We say "longitudinal" because the shuttle-way is, as stated, an approximate helix extending from one end of the drum to the other, and "intermittent" because during the time when the shuttle is in such portions or courses of the shuttle-way as are right-angular to the axis of the drum the carrier and rack-shaft will be at rest, while when it is in such portions or courses as are diagonal to the said axis the said carrier and rack-shaft will be in motion with respect to the drum and the housing of the machine.

In order to permit of the entrance of the shuttle under consideration into its shuttle-way, and of its exit therefrom when it has traveled throughout the length thereof, it is necessary that the said shuttle-way should at its respective extremities terminate in the lifting-inclines hereinbefore referred to; and, in order to retain the said shuttle in the shuttle-way during the time of its travel through it, it is necessary that the shuttle-carrier should be retained at such an angle as is requisite to accomplish such result. This retention of the shuttle-carrier at a given angle is accomplished by what we term a "shuttle guide-bar," L, (best shown in Figs. 6, 7, and 19,) which serves as a guide to retain the arm $k^\times$ of the shuttle-carrier either in the position represented in full lines in Fig. 19, in which event the shuttle $k^2$ is in action, or in the position represented in dotted lines in said figure, in which event the shuttle $k^3$ is in action. The change of the arm $k^\times$ from the one position to the other takes place at the completion of the right or left hand movement of the rack-shaft and carrier, and is rendered possible by providing the shuttle guide-bar L with what we term "bar-slots" $l$. (Best seen in Fig. 7.) The action is this: When the arm of the shuttle-carrier is abreast of one of these bar-slots, the said arm can move freely through said slot, and in such manner the shuttle-carrier can tilt or change its position so as to bring one or the other of its shuttles into its respective shuttle-way. This tilt of the shuttle-carrier, and consequent throw of its said arm, is in the rotation of the drum effectuated by the travel of a given shuttle over one or the other of the lifting-inclines which terminate a given shuttle-way, as will be clearly understood by any mechanic. So soon, therefore, as a given shuttle has traveled up a given lifting-incline, which it does when said shuttle is at the end of its travel through one of the shuttle-ways, its ascent occasions the tilt of the shuttle-carrier, change of position of the arm, and the descent of the opposite shuttle into the other or then "returning" shuttle-way, which in the conformation and then position of the drum presents itself to said shuttle. The further rotation of the drum by the engagement of the then depressed shuttle in its shuttle-way will instantly by the converging form of the sides of the lifting incline or inclination of the shuttle-way occasion such lateral movement of the shuttle-carrier as will retain the arm thereof either above or below the shuttle guide-bar, as the case may then be.

The office of the shuttle-ways of the drum is, as stated, to occasion the continuous, although intermittent, travel of the rack-shaft from one side of the machine to the other, the periods when said shaft is moving, or those periods when a shuttle is in an oblique course of its shuttle-way, being those periods when the can-holders are in the act of rotation and the rocking head raised, as will be hereinafter more fully explained, and the periods when said rack-shaft is at rest, or those periods when the shuttle is in a straight course of its shuttle-way, being the periods when the can-holders are at rest and the rocking head down in the position required to dip the seams of the can.

It is proper for us to state that the shuttle-drum, the shuttle-carrier and its shuttles, the shuttle guide-bar, the sliding oscillatory rack-shaft, and the pinion which it actuates together constitute, when suitably mounted, connected, and actuated, a mechanical movement for reversing motion, which is the subject of a separate application for patent, which we have filed during the pendency of this application, and that we do not in this application desire to claim, broadly, the elements which compose the above mechanical movement, but only to claim them in connection and combination with other devices essential to compose a soldering-machine of the class herein set forth. The rack-shaft itself is journaled in screw-sleeves M, (best shown in Figs. 4 and 5,) which are contained in the split sleeve-bearings $a$ of the housing, and which are, by means of threads $m$, cut upon their exteriors and engaging with key-bolts $m'$, adapted to be set in or out with respect to their bearings in the housing, and so to permit of the longitudinal adjustment, to a slight extent, of the rocking head upon the said rack-shaft, and the consequent slight rotation of the pinion-shaft for the purpose of a slight adjustment of the set of the can-holders in one direction, as any mechanic will understand is possible when the description of the operation of the said can-holders hereinafter described is understood. The said adjustment also allows the wear of the rocking head to be "taken up," and thus avoids lateral oscillation or "play."

N is the rocking head of the machine, (best seen in Figs. 1, 2, 3, 6, 7, and 13,) the same being a forked frame with its ends $n\ n$ surrounding the rack-shaft, but not touching it, and hinged for oscillatory movement about the axial line thereof by being fitted over the conical ends of M M. The said axial line being common to the rocking-head, the shuttle-arm, and the rack-shaft, allows them to perform their respective motions without interference.

In Fig. 21 is represented the construction above mentioned, in which the inner ends of the screw-sleeves are turned off to a tapering or conical section, the bores of the boxings $n$ of the rocking head being correspondingly countersunk to permit of the accurate lateral adjustment of the rocking head, and also to furnish a means for taking up wear. In the above view the tapering surfaces are designated by the letter $m^4$, and the cylindriform interspace within the boxings and around the shaft by the letter $m^3$. The above construction, while the best, is not necessarily the only one which can be resorted to; and in Figs. 4 and 13 the boxings of the rocking head are represented as journaling direct upon the shaft.

Constituting a part of and projecting from this rocking head is a tubular extension or arm, $n^\times$, which contains, in suitable bearings formed in the respective extremities thereof, the head-shaft O. (Seen in Fig. 6.) The head-shaft, as to its lower extremity, is provided with a pinion, P, which is in constant engagement with the rack of the rack-shaft. It is obvious that the longitudinal travel of the rack-shaft, through its engagement with the pinion P, will occasion the rotation of the head-shaft O either to the right or left hand, according to the direction of movement of said rack-shaft. The upper extremity of the tubular arm of the rocking head carries, or is provided, in the form of apparatus shown, with two can-holder supports, Q, Figs. 1, 2, 3, 6, 8, 11, and 12, being of essentially the character set forth in Letters Patent No. 297,629, hereinbefore referred to—that is to say, being each a circular frame, ring, or band rigidly affixed or secured with respect to said tubular arm, so as to project downwardly and forward in a plane at right angles to the axis of said tubular arm, or at an angle determined by the angle of the seam of the can—such as to cause the sustentation of the can-holders at such a relative angle as will insure the immersing in a vertical position of the seams which are to be dipped. Each of the can-holder supports contains a can-holder, R, having a central rectangular or other shaped band, $r$, the angles of which are provided with downwardly-extending angular ears $r'$ or can-guards. The peripheral edges of the can-holders are, as shown, provided with teeth $r^2$, which respectively engage with a toothed wheel, $P^\times$, secured upon the upper extremity of the pinion-shaft O, and are retained in position and covered by a cap, $p$.

In the principal essential features of construction the can-holders and holder-supports of our present apparatus do not differ from the same parts as described in the patents to G. H. Perkins, hereinbefore at length referred to. The can-holders are conveniently retained in place by a bolt and washer, $q$, applied to the can-holder support, and represented in Figs. 11 and 12. The central band, $r$, bounding the openings in each can-holder, and from which the angular ears depend, is made intentionally slightly larger than the can which it is intended to contain, to permit of a slight movement of the can within its holder, in the manner and for the purpose explained in the patents hereinbefore referred to.

It is obvious that the rotation of the toothed wheel $P^\times$ will occasion the rotation of both can-holders in the same direction—a direction dependent upon the direction of the rotation of the pinion-shaft under the actuation of the rack-shaft.

As already stated, the periods of rotation of the can-holders are the periods during which one of the shuttles is traveling through an oblique course of its shuttle-way and so as to slide the rack-shaft, an action taking place during the period when the rocking head is raised, as hereinafter explained. Each shuttle way of the drum, intermediate of its straight courses, is provided with a sufficient number of oblique courses of sufficient length and suitable trend to occasion four quarter turns or rotations of the can-holders; and each shuttle-way is also provided with an oblique course of such curvature, trend, and extent as to occasion an eighth-turn in reversal of the said can-holders. In fact, the path of each shuttle-way (the ways, although reversed, are oppositely identical) being a subject of both mathematical and practical calculation, cannot be further described than in the manner herein already done.

It is to be understood that the devices for operating the rocking head act to occasion its lift before a shuttle engages in an oblique course in its shuttle-way, and do not permit its descent until after the consequent rotation of the can-holders is completed.

The devices for occasioning the lift and drop and the retention in its uppermost position of the rocking head and can-holders are the following:

$n'$, Figs. 3, 6, 7, and 13, is a depending leg of the rocking head, the set of which is to the front of and in the path of the head-cam I, which latter by engagement against said leg once in every rotation of the drum occasions a predetermined lift and drop of the rocking head and can-holders. The head-cam is so adjusted with respect to the shuttle-drum that the period of engagement of its lifting-crest with the leg of the rocking head corresponds to the period when a shuttle is traveling through one of the oblique courses of its way—that is to say, the rocking head is raised by said cam at a time when the rack-shaft receives a longitudinal thrust, and the rotation of the can-holders therefore takes place while they are held clear from the solder-pans.

$n^2$ is a lateral foot at the extremity of the leg $n'$, the outer extremity of which, extending beyond the housing, is in the path of the head-stop $d^4$ of the trip spur-wheel, and being encountered by said head-stop once in every five revolutions of the drum is held out by said head-stop during the periods when the machine is dipping the corners of the cans, and so as for such purpose to retain the rocking head in its elevated position, or that represented in Fig. 6. The travel of the trip spur-wheel, except when the above head-stop encounters the foot $n^2$, is without influence upon the rocking head.

$n^3$ is a spiral spring connected with the leg of the rocking head, on the one hand, and with a fixed point of support in the housing upon the other, and operating by its tension to partly balance the rocking head, and thereby cushion its drop in the play of its leg upon the head-cam.

S is a solder-pan and furnace supported upon a tray, $s$, formed as a part of or suitably connected with the housing. The pan and furnace are preferably constructed in substantial accordance with Letters Patent No. 154,077, granted to George H. Perkins August 11, 1874. Any other pan or furnace may, however, be substituted in the stead of the above. The pan contains transverse ribs or stops $s^x$, erected from the upper surface of its floor, the edges of which are below the level of the molten solder. These ribs constitute a rest for the seam of the can, and, as is understood by those familiar with this class of dipping-machines, may be dispensed with, and either the floor of the pan or other equivalent projection or device be used as a rest against which the can may level itself.

T, Figs. 1, 2, and 6, are what we term "knockouts," the same being two levers preferably pivoted against the sides of the tubular arm of the rocking head, the forward extremities of which project at a predetermined distance below the openings in the can-holders, serve incidentally as a fixed stop to support the cans by their lower heads and prevent them from falling through the openings in the holders, and also as pivots for the rotary movements of the cans. The chief intention of their employment is, however, to project the cans, after all the sides of one of their head-seams have been completely soldered, from out their holders, and this intention is conveniently effectuated by means of a knockout-lever, $t$, Figs. 1, 2, 3, 6, 7, and 13, fixedly applied upon the shifter-rod, extending upwardly and outwardly from the rear of the machine, and connected with the rear extremity of the knockouts by means of a link, $t'$, which at its upper extremity is connected with a cross-bar, $t^2$, immediately joining together the rear extremities of the said two knockouts. There is a certain amount of play in the joints of the link with the lever and the cross-bar, and this is to permit of the lateral movement of the knockout-lever, which takes place in the movement of the shifter-rod, and which is of an extent sufficient to cause a lever-flange, $t^3$, upon the lever near its point of connection with the shifter-rod, to present itself in the path of the knockout-cam $b$ upon the driving-shaft.

The operation of the knockouts is as follows: During the period when one of the heads of the can is being soldered the shifter-rod is in such position that the knockout-cam $b$ is not in range to encounter the lever-flange of the knockout-lever. The instant, however, that the action of dipping one of the quadruple head-seams of the can is completed the encounter of the trip $d^3$ with the shifter-rod throws the latter into such position that the knockout-lever is encountered by the then revolving knockout-cam, with the result that said lever is suddenly depressed, the link brought down, and the knockouts vibrated about their fulcrum, so as to project the cans from out the holders. The return of the shifter-rod removes the knockout-lever from range of engagement with the knockout-cam, and permits of the gravitative return of the knockouts to their normal position, or that represented in Fig. 6. Certain adjustable stops $t^5$ for the knockouts are shown in the drawings, a detailed description of which is unnecessary, their purpose being simply to limit the throws of said knockouts.

Such being a description of a preferred form of apparatus conveniently embodying our invention, and, in a general way, of the manner in which its various parts in their assembled relationship operate, it will be perhaps proper to rehearse more fully certain features of the operation. It is understood that in the position of rest the machine occupies the position represented in Figs. 2 and 6—that is to say, with the rocking head in the elevated position, due to the resting of the foot of its leg against the head-cam I, the successive oscillations of the said rocking head being occasioned by said head-cam. The rotations of the can-holders are designed to effectuate precisely that method of dipping which was invented by the said George H. Perkins, and which is described in said Letters Patent, already referred to. The above method, which accomplishes perfect sealing with the minimum of solder, is performed by retaining a given side of the seam in the solder until the tin about it is thoroughly heated; by then taking that side out of the solder at an angle, one of its ends rising before the other, in the manner represented in Fig. 10; by then turning the can and dipping the succeeding side into the solder in the quickest possible time, so that the side previously dipped will be still hot enough to continue to drain after its removal from the bath; by proceeding in the above manner until each of the four sides has been dipped, meanwhile, however, raising the fourth side from the bath at an angle opposite to that at which the others have been raised; and by, finally, reversing the can, so as to present that corner which is intermediate between the two sides last dipped, and then dipping that corner. It is to be clearly understood, therefore, that all four sides of one of the head-seams of the can (speaking now of one can only, although what is said applies to both) are by the present apparatus dipped successively; that the first three sides, after having been dipped, are lifted from the solder in a similar angular position, so as to effect a similar drainage of each side; that the fourth side is lifted in an angular position opposite to that in which the first three sides were lifted, so as to occasion the reverse drainage of said last side; and that the can is then given an approximately eighth-turn in reversal, and a corner of its seam toward which the drainage of the last side was directed and which is intermediate between the two sides last dipped, dipped so that the last drop of solder adhering to the corner is effectually drained off. It is, moreover, to be understood that the successive quarter-turns and the eighth-turn in reversal of the can-holders are occasioned by the intermittent but progressive lateral movements of the rack-shaft, the extent of the lateral travel in a given direction being governed entirely by the travel of a given shuttle in a given shuttle-way of the drum, and the periods during which the said rack-shaft is at rest, as well as the extent, direction, and duration of its motion, being governed and determinable by the length and trend of the various courses of the shuttle-ways of the drum, and in a measure, also, by the fact of whether the front or rear shuttle is engaged in its shuttle-way. The construction of the said shuttle-ways being, as already stated, a matter of mathematical and practical determination, and their relative disposition upon the surfaces of the drum with respect to the set of the head-cam upon said drum being such as to time the movements of the rack-shaft and the consequent rotation of the head-shaft and can-holders to periods corresponding with the periods of the rise of the rocking frame, the rotations of the can-holders always take place while the rocking head is in the air, and their periods of rest correspond to the periods when the rocking head is permitted to descend, so as to occasion the dipping of either one of the sides of a head-seam, or the corner of said seam. The direction of the rotation of the can-holders is also dependent upon the direction in which the rack-shaft is for the time being traveling— that is to say, when the rack-shaft is traveling toward the right of the housing, the direction of the rotation of the can-holders is as the hands of a clock, technically known as "right-handed," while their direction is "left-handed" when the said rack-shaft is traveling in the opposite direction. The eighth-turn in reversal occurs when the shuttle is some distance from the end of the drum, the changing of the shuttles and the commencement of the return travel of the rack-shaft having taken place during the fourth side dip. After the dipping of the corner a further motion of the rack-shaft takes place, which is sufficient to square the holders with respect to the solder-pans, and present them in readiness to receive other cans. This completes a half-cycle, a whole cycle consisting of two sets of dips and the returning of all parts to their original position. The knockouts operate immediately after the said action of squaring up the can-holders is completed. The normal set of the can-holders, which is intentionally slightly out of parallelism with the solder-pans, as well as the intentional construction of the opening in the can-holders of a size slightly larger than the can, and the consequent effects of such set and structure in the lifting of the can at an angle, are in this apparatus precisely similar to the same conditions and structures in the former machines of the said Perkins, described in the Letters Patent hereinbefore mentioned. Further descriptions of these features would therefore be redundant in this specification, in which the said features are not in themselves claimed as novel. The precise set of the can-holders with respect to the holder-supports and the solder-pan is controllable, as already explained, to a slight extent in either direction by the adjustment of the shuttle-casting of the shuttle-carrier, on the one hand, and by that of the screw-sleeves within which the rack-shaft is journaled on the other.

We have now described both that construction and that operation which we believe to effectuate our invention in the most advantageous manner. We desire, however, to add that we do not restrict ourselves to the precise form and relative arrangement of the component parts described, as a skillful mechanic could without doubt make many changes in detail of both construction and arrangement without departing from the invention, properly as such. We ourselves, for instance, contemplate the employment of other clutch mechanism than that represented and described for the starting and stopping of the machine, and such as is not dependent upon a treadle to be set in action. We also contemplate the employment of a greater number of can-holders than two—a result readily accomplished by interposing additional idler-toothed wheels corresponding in proportions to the toothed wheel $P^x$ or other motion-communicating devices, and by supporting both the said idler-toothed wheels and the holder-supports of the additional can-holders upon bracketed extensions of the rocking head or the tubular arm thereof. In such case we should increase the number of knockouts to correspond to the number of can-holders. Again, it is perfectly possible to arrange the rocking head to carry but a single can-holder, although such arrangement would be less economical than that which we have represented.

Our apparatus is adapted to solder but one head-seam of each can at a time, and the cans have to be reversed before their other head-seams can be soldered.

In the accompanying claims we have in many instances used the plural in speaking of the can-holders. It is, however, to be understood that we can at will so organize the machine that but one can-holder may be employed, and therefore that our use of the plural does not forbid such arrangement, but is for simplicity of expression merely, and because two holders are shown in the drawings. We have also in some instances used the singular and claimed but a single holder, and this notwithstanding that many holders may, as stated, be employed. It is also proper to explain that while we have with some definiteness spoken of and represented a depending leg with a transverse foot as a connected portion of the rocking head adapted to be respectively operated upon by the head-cam and the head-stop of the trip spur-wheel, it would be perfectly competent for a mechanic to so modify the construction of the head as to provide for its rocking by other means than the precise devices above set forth, and that the cam and leg and the other devices are simply cited as the best devices of which we now have knowledge. It is also proper to state that the head-cam may be mounted and operated independently of the drum, although it is more convenient to mount it as a part of the drum. Again, while we have represented the head-shaft as journaled within the tubular arm of the rocking head, such construction is not a necessary one, as the rocking head can be arranged without a tubular extension, the latter being replaced by a flat web or kindred structure, against which the head-shaft is mounted.

The foregoing and other mechanical modifications will be at once obvious to a trained mechanic, as will also be the fact that the essential features of our machine reside in the construction and arrangement of the shuttle-drum, whereby, through the shuttle-carrier and rack-shaft, intermittent rotation is imparted to the head-shaft and can-holders, the intermissions of said rotations being calculated with respect to the periods of time when the head-cam is caused to operate for the rocking of the head; and, further, that the mounting of the various parts is such as to cause them to co-operate in the two principal actions of lifting and dropping the head and rotating the can-holders.

Having thus described our invention, we claim and desire to secure by Letters Patent—

1. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders; fourth, mechanism whereby the rocking head is at predetermined intervals caused to rock; and, fifth, mechanism whereby the said shaft, which is connected with and carried by the rocking head, is at predetermined intervals caused to rotate, substantially as set forth.

2. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders, and which is provided with a pinion; fourth, a sliding rack-shaft gearing with the pinion of said head-shaft; fifth, suitable means for occasioning the longitudinal intermittent reciprocation of said rack-shaft in both directions; and, sixth, mechanism whereby said rocking head is at predetermined intervals caused to rock, substantially as set forth.

3. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders, and which is provided with a pinion; fourth, a sliding rack-shaft gearing with the pinion of said head-shaft; fifth, a shuttle-carrier provided with shuttles and rigidly connected with the rack-shaft; sixth, a rotatable drum provided with shuttle-ways for the shuttles; and, seventh, mechanism whereby said rocking head is at predetermined intervals caused to rock, substantially as set forth.

4. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders, and which is provided with a pinion; fourth, a sliding rack-shaft gearing with the pinion of the head-shaft; fifth, a shuttle-carrier provided with shuttles and rigidly connected with the rack-shaft; sixth, a rotatable drum provided with shuttle-ways for the shuttle; and, seventh, a head-cam rotating in unison with the drum and adapted to bear against a part of said rocking head, so as to occasion the rocking of said head at predetermined intervals, substantially as set forth.

5. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders; fourth, mechanism whereby the rocking head is at predetermined intervals caused to rock; fifth, mechanism whereby the said shaft, which is connected with and carried by the rocking head, is at predetermined intervals caused to rotate; and, sixth, knockouts or devices for ejecting the cans from the holders, substantially as set forth.

6. In a machine for soldering the seams which secure the heads to the bodies of quadrangular, square, hexagonal, and other shaped sheet-metal cans having angular corners, the following instrumentalities in combination: first, rotatable can-holders each adapted to receive a can; second, a rocking head to which said can-holders are connected so as to rock therewith; third, a shaft connected with and carried by said rocking head, the rotation of which, through suitable gears or kindred motion-communicating devices, occasions the rotation of the can-holders; fourth, mechanism whereby the rocking head is at predetermined intervals caused to rock; fifth, mechanism whereby the said shaft, which is connected with and carried by the rocking head, is at predetermined intervals caused to rotate; sixth, knockouts or devices for ejecting the cans from the holders; and, seventh, suitable devices for at predetermined intervals occasioning the operation of the knockouts, substantially as set forth.

7. In a machine of the class above recited, in combination with the rocking head, head-shaft, and can-holders, a rack-shaft adapted for both oscillatory movement and longitudinal travel, a shuttle-carrier fixedly connected with said rack-shaft and provided with two shuttles, and a drum having two shuttle-ways which in opposite directions in continuous courses circumscribe the drum, and in which ways the shuttles are adapted to be respectively but alternately engaged, whereby upon the rotation of the drum the shuttle-carrier and rack-shaft are caused to travel longitudinally in both directions from end to end of the drum, substantially as set forth.

8. In a machine of the class above recited, in combination with the rocking head, head-shaft, and can-holders, a rack-shaft adapted for both oscillatory movement and longitudinal travel, a shuttle-carrier fixedly connected with said rack-shaft and provided with two shuttles, a drum having two shuttle-ways which in opposite directions in continuous courses circumscribe the drum, and in which the shuttles are adapted to be respectively but alternately engaged, and a head-cam rotating in unison with the drum, adapted to bear against a leg or other projection from the rocking head, whereby upon the rotation of the drum the shuttle-carrier and rack-shaft are caused to travel longitudinally in both directions from end to end of the drum and the rocking head is intermittently caused to rock, substantially as set forth.

9. A drum having two shuttle-ways, which in opposite directions in continuous courses circumscribe the drum, the said respective ways intersecting each other and being as to portions of their respective courses right-angular with respect to the axis of the drum, and as to other portions of said courses oblique thereto, and each of said ways terminating in an incline from the bottom of said way to the exterior surface of the drum, in combination with the shuttle-carrier and its connected shuttles, the sliding rack-shaft, the head-shaft, the rocking head, and the can-holders, substantially as set forth.

10. A drum having two shuttle-ways, which in opposite directions in continuous courses circumscribe the drum, the said respective ways intersecting each other and being as to portions of their respective courses right-angular with respect to the axis of the drum, and as to other portions of said courses oblique thereto, and each of said ways terminating in an incline from the bottom of said way to the exterior surface of the drum, and a head-cam rotatable in unison with said drum, in combination with the shuttle carrier provided with shuttles, the sliding rack-shaft, the head-shaft, the rocking head provided with a depending leg for said head-cam to encounter, and the can-holders, substantially as set forth.

11. In a machine of the class above recited, the combination of the rocking head carrying can-holders and equipped with a head-shaft and pinion, the rack-shaft, the shuttle-carrier, the shuttle-drum, a driving-shaft geared so as to rotate said drum, a driving-pulley, and a clutch between said driving-pulley and said driving-shaft, substantially as set forth.

12. In a machine of the class above recited, the combination of the rocking head carrying can-holders and equipped with a head-shaft and pinion, the rack-shaft, the shuttle-carrier, the shuttle-drum, a trip spur-wheel rotating freely and geared from said drum, a driving-shaft geared so as to rotate said drum, a driving-pulley revolving freely upon said driving-shaft, a clutch for at will rendering the driving-pulley fast upon the driving-shaft, a treadle for operating said clutch, a spring-controlled shifter-rod for controlling the set of said treadle, and a trip for said shifter-rod mounted upon the trip spur-wheel, substantially as set forth.

13. In combination with a rocking head carrying can-holders and provided with a depending foot, the trip spur-wheel provided with a head-stop adapted, in the revolution of said spur-wheel, to deflect the foot of the rocking head, substantially as and for the purposes set forth.

14. In combination with the rocking head, the knockouts, the knockout-link, the knockout-lever mounted upon the shifter-rod, the shifter-rod, the driving-shaft, and the knockout-cam upon said driving-shaft, as and for the purposes specified.

15. In a machine of the class above recited, the following devices in combination: the rocking head having a tubular arm or extension, a head-shaft journaled with respect to said tubular arm, the can-holder supports connected with the tubular arm, the can-holders carried by said holder-supports and geared from the head-shaft, and an axis in the housing of the machine, with respect to which axis said rocking head is adapted to rock, substantially as described.

16. In a machine of the class above recited, the combination of the rocking head carrying can-holders, constructed as described, and provided with a head-shaft equipped with a pinion, and the sliding cylindriform rack-shaft constituting the axis upon which said rocking head is mounted so as to rock, the pinion of the head-shaft being engaged with the racks of the rack-shaft, and the cylindric form of said rack-shaft preventing the disengagement of the pinion of the head-shaft with the rack of said rack-shaft when the head rocks, substantially as described.

17. In a machine of the class above recited, in combination with the rocking head formed with a tubular arm, a head-shaft journaled within said tubular arm and provided at its upper extremity with a toothed wheel and at its lower extremity with a pinion, can-holder supports carried by the said tubular arm of the head, and can-holders contained in said holder-supports and circumferentially provided with teeth which engage with the toothed wheel of the head-shaft, whereby upon the rotation of the head-shaft the can-holders are rotated in the same direction, substantially as described.

18. In a can-soldering machine of the class herein recited, and in combination with a rocking head carrying can-holders, with a shuttle-drum, and with a sliding rack-shaft, the shuttle-carrier provided with an arm to which one of the shuttles is applied, and also provided with an adjustable shuttle-casting to which the other shuttle is applied, substantially as and for the purposes set forth.

19. In a machine of the class above recited, the combination of the shuttle-drum, the sliding rack-shaft, the rocking head carrying can-holders, the shuttle-carrier provided with an arm and with two shuttles and mounted and operated as described, and a shuttle guide-bar fixed in the housing of the machine having bar-slots near its respective extremities, and operating, substantially as set forth, to retain the arm of the carrier either on its upper or under surface and the shuttle-carrier in such position as to cause the engagement of one or the other of its shuttles with the shuttle-drum, as and for the purpose specified.

20. In a machine of the class above recited, the rocking head carrying can-holders and provided with the depending leg and foot, in combination with the head-cam, and with the head-stop on the trip spur-wheel, the arrangement being such that the head-cam of the drum occasions four oscillations of the head between every engagement of the head-stop with the foot of the head, as and for the purposes set forth.

21. In combination with the rocking head carrying can-holders and provided with a depending leg, in a machine of the class above recited, the spiral head-spring for cushioning the downward throw of the rocking head, substantially as described.

22. The combination of the housing, the adjustable screw-sleeves, the rocking head carrying can-holders, and the sliding rack-shaft, as and for the purposes specified.

23. In a can-soldering machine of the class herein recited, the combination of the shuttle-carrier, the shuttle-casting, means for adjusting the set of said shuttle-casting laterally with respect to said carrier, the shuttle-drum, the sliding rack-shaft, and the rocking head carrying can-holders, as and for the purposes set forth.

24. The shuttle-drum provided with shuttle-ways of the character described, and with a head-cam, in combination with a rocking head carrying can-holders and provided with a depending leg, substantially as and for the purposes specified.

25. In a machine of the class above recited, in combination with the rocking head constructed as described, and equipped with can-holders and the head-shaft, the sliding rack-shaft, the shuttle-carrier, and shuttles connected with said sliding rack-shaft, a cam operating to occasion the lift and drop of the head, and a shuttle-drum provided with shuttle-ways, the courses of which ways form varying paths and are adapted, in the revolution of the drum and the engagement of a given shuttle, to occasion intermittent motions of the shuttle-carrier and rack-shaft calculated to impart predetermined rotations of varying extent to the can-holders, and between these intermittent advances to leave the rack-shaft at rest for periods long enough to permit of the operation of the cam for the movement of the rocking head, substantially as and for the purposes set forth.

In testimony whereof we have hereunto signed our names this 15th day of July, A. D. 1884.

GEORGE H. PERKINS.
OBERLIN SMITH.

In presence of—
J. BONSALL TAYLOR,
JAMES J. REEVES.